Patented May 28, 1940

2,202,529

UNITED STATES PATENT OFFICE 2,202,529

PRINTING PROCESS

Albert L. Lengel, Berkeley, Calif.

No Drawing. Application October 11, 1937,
Serial No. 168,395

15 Claims. (Cl. 101—211)

The invention relates to printing processes and particularly to multi-colored printing processes.

Heretofore in producing multi-colored printing matter, a plurality of impressions of different colors have been used so as to produce a plurality of colors and shades by the fusion of the colors applied. Where substantially complete color is desired, it is common to use three plates, each making an impression of one of the primary colors of red, blue and yellow, so that these colors alone and in their fused form will provide the desired color combinations. Often in addition to these three color impressions a fourth impression is made to bring out the details of the picture. This procedure in producing multi-colored printed matter is relatively complex and expensive inasmuch as each of the color plates must be individually made from special cuts prepared by artists so as to afford a proper distribution of each particular color on the printed surface.

In accordance with the present invention and as a principal object thereof I provide for the printing of a surface or article in a plurality of colors with the use of a substantially reduced number of plates and by such process obtain the primary and secondary colors and substantially all shades and hues of these colors in a more exacting and natural form than heretofore, and with a substantial reduction in the work and complexity of the printing operations.

The invention possesses other objects and features of advantage, some of which, with the foregoing, will be set forth in the following description of the preferred form of the invention. It is to be understood, however, that variations in the showing made by the said description may be adopted within the scope of the invention as set forth in the claims.

Stated briefly, the invention consists in imprinting on a surface a pre-determined distribution of a vehicle or the like having a color pigment subject to change in color in the presence of certain chemicals and the imprinting or fixation on the surface of a pre-determined distribution of such a chemical for affecting the color of the pigment. Either one or a plurality of such combinations may be used for controlling the final color of the printed matter. Either the color pigment or the chemical may be first applied to the stock being printed, so that upon addition of the other an appropriate change in color is effected, or the color and the chemical may be applied to the surface by means of plates or the like controlling a pre-determined distribution of the pigment and chemical. On the other hand, a plurality of vehicles may be used wherein each vehicle is provided with a color pigment and a chemical which either does not affect the pigment or maintains the latter at a certain color, and a second vehicle having a pigment which is affected by the chemical in the first vehicle and a chemical which affects the pigment of the first vehicle.

As a color pigment I may use certain standard pigments or so-called "indicator dyes" which are subject to change in color in the presence of certain chemicals. For example, in the common pigment class I may use Eosin type of dye, iron blues, Victoria blue, ultramarine and others. The indicator dyes which may be used are exceedingly numerous, running into the hundreds, and include methyl red, thymol blue, thymolphthalein, phenolphthalein, thymolsulphonphthalein, nitrophenols, etc. I may also use the so-called oxidation or reduction dyes, including such chemicals as diphenylamine. Also as will be hereinafter clear, various combinations of these pigments may be used and also various of these pigments may be used with certain of the more fixed pigments.

When using the above a suitable chemical is applied having a proper acidity or alkalinity for controlling the color of such pigments. For example, the color of the Eosin type dye is affected by a relatively strong alkali, as is also iron blues, which can be caused to disappear in the presence of an alkali. Victoria blue will similarly disappear in the presence of an alkali, while ultramarine has an opposite reaction and is affected by and disappears in the presence of suitable acids.

The indicator dyes are more sensitive to chemical change and afford a greater variety of color change. These dyes change in color with the pH value of their solutions. Thus methyl red is red below pH of 4.2 and shades into yellow between 4.2 and 6.3. Thymol blue is colorless below 9.3 and changes to blue above 10.6. Thymolphthalein is colorless to 9.3 and changes to blue at 10.5. Phenolphthalein is colorless to 8.4 and shades through pink to red between 8.4 and 10. Thymolsulphonphthalein is red below a pH value of 1 but changes to orange between 1 and 3, to yellow between 3 and 7.4 and is blue above 9. Meta and para nitrophenol are colorless to a pH of 6.3 and become yellow at 9.

In practicing the present invention the chemical and pigment may be either applied to the surface by means of a plate or the like or may be initially incorporated in the surface to be printed. Preferably, the ink or other printing vehicle is applied to the surface by means of a plate having a predetermined distribution of the ink to bring out the details as well as the color of the picture. It will be understood that the color obtained by the use of the present process results from a relative concentration of the chemical and the pigment. This relative concentration may be controlled by the controlled application of the pigment or the application of the chemical or both.

In the preferred form of the invention I prefer to use individual applications of the ink and the chemical to the surface to be printed and in most instances it does not matter which is applied first. Greater versatility is obtained by using the chemical in an ink vehicle which has a color pigment unaffected by the presence of the chemical so that added color and shades may be obtained in addition to that produced by the presence of the chemical on the second pigment used. It is possible to incorporate a chemical in each of the ink vehicles that does not react with the pigment in its own vehicle but will react with the pigment in the other vehicle used, so that a greater number of combinations may be obtained. The printing may be accomplished by any of the well-known methods such as the common relief type of printing, the intaglio or Rotogravure, or the off-set or transfer printing method. In any case, the plates are used to accurately predetermine the distribution of the ink and chemicals on the surface to be printed and these plates may be prepared from cuts partially painted out and specially treated by artists working from a standard color chart prepared from known color reactions obtained from the present process. In this manner the tonal values of the plates may be accurately controlled for depositing a predetermined distribution of pigment and chemical for obtaining the desired color effect.

As a specific example of the present process I may use a pair of printing vehicles having substantially the following formulas, percentages and parts being by weight.

*Vehicle 1.*—The base may be as follows:

|  | Per cent |
|---|---|
| Oxalic acid | 0.2 |
| Water | 9.8 |
| Ethylene glycol | 50 |
| Glucose | 40 |

The formula consists of:

|  | Parts |
|---|---|
| Base | 80 |
| Methyl red | 10 |
| Thymol blue (thymolphthalein) | 10 |

*Vehicle 2.*—Base:

|  | Per cent |
|---|---|
| Ink oil "G" (an alkaline water soluble oil produced by Standard Oil Co., Richmond, California) | 40 |
| Ethylene glycol | 25 |
| Calcium hydroxide | 5 |
| Water | 15 |
| Sodium linoleate | 15 |

Formula of Vehicle 2 consists in:

|  | Per cent |
|---|---|
| Base | 90 |
| Thymol blue | 10 |

When these two vehicles are printed on each other with plates of different combinations of tonal values a substantial variety of colors is obtained. The chart hereunder has been prepared from the use of these two vehicles applied to common printing stock with sixty-line plates having different tonal values from 0 to 100%.

| Vehicle No. 1, 60 line plate approximate percent tonal value | Vehicle No. 2, 60 line plate approximate percent tonal value | Color obtained by imposition |
|---|---|---|
| 100 | 0 | Red. |
| 90 | 10 | Deep orange. |
| 80 | 20 | Orange. |
| 70 | 30 | Light orange. |
| 60 | 40 | Yellowish orange. |
| 50 | 50 | Lemon yellow. |
| 40 | 60 | Canary yellow. |
| 30 | 70 | Greenish yellow. |
| 20 | 80 | Light bluish green. |
| 10 | 90 | Greenish blue. |
| 0 | 100 | Blue. |

The contents of the dyes in the vehicles may be varied considerably and the combination of tonal values may also be varied appreciably from that indicated above. The number of combinations of dyes and tonal values and shades of color which may thereby be produced are substantially unlimited.

In practicing the present invention an artist is given suitable color charts as indicated above and photographic or other cuts are shaded by the artists to produce desired tonal values on plates to be used with certain vehicles indicated in the color charts furnished. In this manner an extremely wide selection of colors is available to the artist by the simple expediency of controlling the predetermined arrangement of the tonal values on the plates used in printing.

While the invention has been particularly described in connection with a printing process, it will be understood that vehicles may be combined or mixed prior to application to produce a plurality of colors or shades. Thus the invention may be applied to producing artists' materials, whereby only a few vehicles will be required to produce substantially all desired colors. In the latter instance the artist by a pre-mixing of the vehicles on his pallet causes the color materials in the vehicles to change to desired color and shade and the mixture is applied to the subject.

I claim:

1. A process for producing multi-colored printed matter which consists in applying to the surface to be printed a vehicle having a color pigment and applying to said surface in various distributed amounts an agent chemically reactive with said pigment for affecting the color of said pigment to produce a plurality of colors proportional to the amounts and distribution of agent applied.

2. In the process of multi-colored printing with plates or the like for impressing a printing vehicle having a color pigment on a surface, that step which consists in the impressing on said surface by means of a plate a varied and predetermined distribution of an agent chemically reactive with said pigment for changing the color of pigment contacted thereby to produce a plurality of colors depending upon said pre-determined distribution.

3. The process of producing a multi-colored article which consists in imprinting thereon a varied and pre-determined distribution of a vehicle having a color pigment and imprinting on said article a varied and pre-determined distribution of an agent chemically reactive with said pigment for affecting the color of said pigment, to produce a plurality of colors depending on the ratios of vehicle and agent applied to various areas of said article.

4. A process of printing which consists in making a plurality of impressions on a surface to be printed wherein one of said impressions is made with a vehicle having a color pigment and another of said impressions is made with an agent having a varied and pre-determined distribution and chemically reactive with said pigment to change the color of said pigment into a plurality of colors depending on the relative proportions of said pigment and agent applied.

5. The process of producing a vehicle of various colors for printing or painting or the like which consists in mixing a plurality of vehicles wherein one of said vehicles is provided with a color material and another of said vehicles is provided with an agent chemically reactive with said material to change the color thereof to a plurality of different colors depending upon the relative proportions of said vehicles.

6. A plurality of vehicles adapted for printing or painting or the like to produce a multi-colored subject, one of said vehicles having a color material, and the other vehicle having an agent chemically reactive with said material upon mixing of said vehicles to change the color of said material and providing a plurality of colors dependent upon the proportions of said vehicles so mixed.

7. The process of printing a multi-colored printed surface which consists in making a plurality of impressions on said surface with half-tone plates carrying printed vehicles wherein one of said vehicles contains a color pigment, and another of said vehicles contains an agent chemically reactive with said pigment to change the color of said pigment according to the relative proportion of agent and pigment, and controlling the tonal values of said plates so as to produce a plurality of predetermined colors at predetermined areas on the printed surface.

8. The process of printing a multi-colored printed surface which consists in applying to said surface a color pigment and an agent chemically reactive with said pigment to change the color of said pigment to produce a plurality of colors depending upon the relative density distribution of said pigment and agent, and applying one of said materials by means of a half-tone plate having a controlled pre-selected distribution of tonal values to thereby accurately control the relative proportions of said materials on various areas of said surface.

9. The method of producing a multi-colored printed surface by combining on said surface various proportions of a color pigment and an agent chemically reactive with said pigment to change the color of said pigment which consists in providing prints of the object to be printed, shading said prints to produce pre-determined tonal values thereon, producing half-tone plates from said prints, and printing said pigment and agent aforesaid with said plates.

10. The method of producing a multi-colored printed surface by combining on said surface various proportions of a color pigment and an agent chemically reactive with said pigment to change the color of said pigment which consists in providing a print of the object to be printed, shading said print to produce pre-determined tonal values thereon, producing a half-tone plate from said print by photo-engraving process, and printing one of the materials aforesaid.

11. A plurality of vehicles adapted for printing or painting or the like to produce a multi-colored subject and having different pH values, the combination of methyl red and thymol blue in said vehicles adapted when combined in a plurality of proportions to produce a plurality of colors.

12. A plurality of vehicles adapted for printing or painting or the like to produce a multi-colored subject and having different pH values, each of said vehicles containing an indicator dye having one color in its vehicle and a different color when contacted with the other vehicle.

13. A process for producing multi-colored printed matter which consists in applying to the surface to be printed a vehicle having an indicator dye and a pH value maintaining said dye at one color in said vehicle, applying to said surface another vehicle having a pH value different than said first vehicle and operable on contact with said dye to change the color thereof and containing a second indicator dye having one color in said second vehicle and a different color when contacted with said first vehicle, and controlling the relative distributions of said vehicles on said surface to produce a predetermined color distribution thereof.

14. The process of producing multi-colored printed matter which consists in making a plurality of impressions on a surface to be printed wherein one of said impressions is made with a vehicle containing an indicator dye and another of said impressions is made with a vehicle having a pH value different from the pH value of said first vehicle and operative upon contact with said dye to change the color thereof from its color in said first vehicle, and controlling the distribution and amount of deposit of at least one of said vehicles to produce a predetermined variety and distribution of color on said surface.

15. The process of producing multi-colored printed matter on a surface having a known pH value which consists in applying to said surface a vehicle having a different pH value and containing an indicator dye having one color at the pH of the vehicle and a second color at the pH of the surface, and controlling the distribution and quantity of deposit of said vehicle on said surface for producing a predetermined variety and distribution of color thereon.

ALBERT L. LENGEL.